INVENTOR.
JOHN CINCOTTA

3,752,762
APPARATUS FOR REMOVING OIL FROM OIL-CONTAMINATED WATER
John Cincotta, 24—33 W. 3rd St., Brooklyn, N.Y.
Filed Apr. 5, 1971, Ser. No. 131,254
Int. Cl. B01d 15/06
U.S. Cl. 210—32          1 Claim

ABSTRACT OF THE DISCLOSURE

Apparatus is disclosed for using pumice stones for removing oil from oil-contaminated water and for enabling saturated pumice stones to be cleaned so that they can be reused.

BACKGROUND OF THE INVENTION

(1) Field of the invention

Process and apparatus for removing and separating oil from oil-contaminated water.

(2) Description of the prior art

Recently there has been a great deal of interest in protecting the environment from man-made pollution. One reason for this interest is accidents where oil is unintentionally discharged into a body of water. As an example, recently, on the West Coast an under-sea off-shore oil well malfunctioned and a great quantity of oil was discharged into coastal sea water polluting the water, dirtying beaches and destroying marine life.

A further cause of oil spills has resulted from the increasing transportation of oil by tankers. When a tanker is involved in an accident, as has happened in the past, a portion of the oil therefrom is spilled into the surrounding water creating some or all of the ecological problems noted above, supra.

The prior art has attempted in different ways to remove oil from water into which the oil has been accidentally discharged. One such prior art technique involved spreading straw along beaches and in contaminated water so that the oil was absorbed thereby. This was not an altogether satisfactory solution since large bodies of contaminated water could not be effectively treated and a great deal of manual labor was required to remove even small quantities of oil from the water.

A further drawback of removing oil from water by straw and some of the oil absorbing materials that have been previously used was that the material used absorbed a limited amount of oil and then had to be discarded as there was no way of treating the material so it could be reused. This became expensive after a relatively short period of time and created logistic problems in disposing of the oil absorbing material. As an example, in attempting to combat the recent oil spillage on the West Coast straw was utilized to absorb oil and the disposal of the oil-impregnated straw reached such proportions that it was necessary to bury the straw rather than burn the straw in view of the air pollution that would have resulted from the burning.

The desire to remove oil from water is not confined to oil-contaminated sea water but it is also important industrially. As an example, it is often desirable to remove small amounts of oil from water which is used for cooling purposes so that the water can be recycled without contaminating any equipment which it comes in contact with.

SUMMARY OF THE INVENTION

An object of the present invention is to provide apparatus which can remove large quantities of oil from a body of oil-contaminated water as well as be used for industrial purposes where it is necessary to remove oil from oil-contaminated water.

Still another object of the present invention is to provide a process and apparatus for removing oil from a body of oil-contaminated water by passing the oil and water through a filtering material wherein the filtering material after becoming saturated with oil can be treated to have the oil removed therefrom and reused as required.

Briefly, according to the invention, the pumice stones can be placed in a container having an open top, a removable bottom and porous opposed first and second side walls. The pumice stones are placed in the container through the top and oil-contaminated water, such as from an oil spill etc., is directed through the first porous side wall, through the container and out the second side wall thereof. The pumice stones in the container absorb the oil from the water and when they become saturated the bottom of the container is removed allowing the pumice stones to drop on a conveyor. The conveyor transports the pumice stones to a steam-cleaning area which removes the oil therefrom and the pumice stones are then recycled back to the container for further use. It is of course to be appreciated that the operation is continuous and that as soon as saturated pumice stones are removed from the container unsaturated stones are placed therein while the saturated stones are being cleaned.

The present invention can be used industrially for removing oil from water that is used for cooling and other purposes so that the water can be recycled as required.

Other objects of the invention will be pointed out hereinafter.

The invention accordingly consists in the features of construction, combination of elements and arrangement of parts which will be exemplified in the method and apparatus hereinafter described and of which the scope of application will be indicated in the appended claim.

DESCRIPTION OF THE PREFERRED EMBODIMENTS

The present invention requires the utilization of pumice stones as a filtering media for absorbing oil from oil-contaminated water. Pumice stones are formed from rhyolitic lavas having a high gas content which when suddenly discharged by volcanic action congeal in the form of highly vesicular natural glass or pumice. Pumice consists mainly of complex silicates of aluminum, potassium and sodium and is insoluble in water and immune to attack by acids. Pumice stones are highly porous and absorbent and usually as mined have a specific gravity of less than one.

Figure 1:
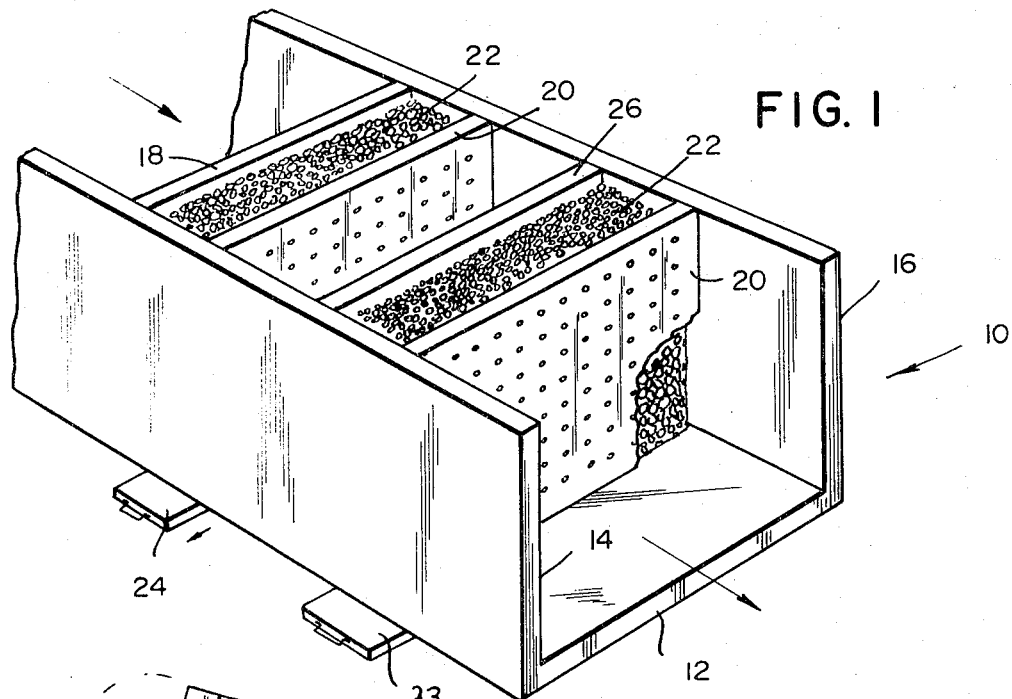
FIG. 1 is a perspective view of apparatus according to the present invention for separating oil from oil contaminated water.

In FIG. 1 of the drawings apparatus is disclosed for removing oil from oil-contaminated water according to the present invention and includes a trough 10 having a base 12 and upright sides 14 and 16. Extending transversely between upright sides 14 and 16 are porous walls 18 and 20 that are parallel to each other and which define a filtering chamber 22. A removable bottom piece 24 can selectively seal the bottom of filtering chamber 22 for a reason that will soon be apparent. A second set of porous transverse walls 26 and 30 define a filtering chamber 32 which chamber has a removable bottom piece 33. It is to be appreciated that while structure for forming two filtering chambers is shown in the drawings any number of said chambers could be formed in trough 10 as desired.

In utilizing the apparatus of FIG. 1 oil-contaminated water, such as a body of sea water which has been contaminated as a result of an oil spill, is pumped through trough 10 in the direction indicated by the arrows. The oil-contaminated water passes through porous wall 18, through filtering chamber 22 and through porous wall 20. The oil in the water is absorbed by the pumice stones in chamber 22 and from chamber 22 the water is directed through the other filtering chambers that are located in trough 10. By serially passing the oil-contaminated water through different filtering chambers the water is progressively cleaned and more and more oil is removed therefrom. When the pumice stones in a chamber have become oil-saturated the bottom piece from the chamber is removed allowing the pumice stones to fall from the chamber. The bottom piece is then positioned to seal the bottom of the chamber and unsaturated pumice stones are placed in the chamber through the top so that the cycle can be repeated.

Figure 2:
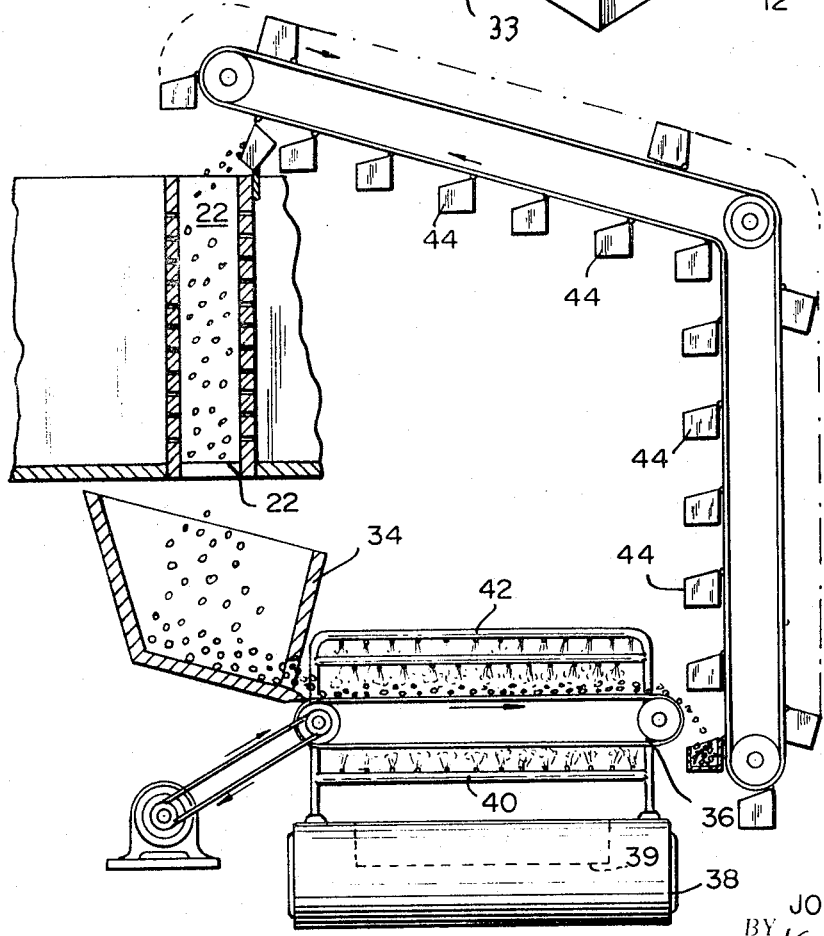
FIG. 2 is a schematic illustration showing how the apparatus of FIG. 1 can be used to continually separate oil from water.

In FIG. 2 of the drawings apparatus is shown whereby the pumice stones are treated so as to be recycled. When the bottom piece of chamber 22 is removed the pumice stones fall into a vat 34 which has an opening at its bottom at the right side thereof. The vat is tilted so that the pumice stones therein spill out through the opening and on to a conveyor 36. A steam forming means 38 which may be a conventional boiler is positioned below conveyor 36 and feeds jets 40 and 42 which are positioned above and below the conveyor to the rear of the conveyor so as to direct steam to the conveyor at an angle. Preferably the conveyor is made of a strong, non-corrosive material and has openings which are not large enough to allow the stones to fall through but do allow steam to pass therethrough. The steam from jets 40 and 42 impinges at an angle on the pumice stones in the conveyor so that the oil is removed from the pores thereof. The oil which is removed from the pumice stones, together with steam forms droplets which fall through the conveyor and are received in a trap 39 which is directly beneath the conveyor.

The clean pumice stones from conveyor 36 are fed into buckets 44 which by a conveyor train transfer the pumice stones into filtering chamber 22 as hereinafter described. Specifically, bottom piece 24 seals chamber 22 until the pumice stones therein become saturated with oil. When this occurs the bottom piece is removed and the pumice stones descend into vat 34 and on to conveyor 36 with the bottom piece then sealing the bottom of the chamber. The stones on the conveyor are cleaned by steam from steam jets 40 and 42 which removes the oil from the pumice stones and the cleaned pumice stones are transferred by buckets 44 and the associated conveyor mechanism to chamber 22. The cycle can be repeated as often as desired. It is to be appreciated that the filtering chamber can be refilled by cleaned stones in buckets 44 as soon as the saturated stones therein are removed so that the filtering operation is continuous.

It is to be appreciated that the conveying apparatus can be designed to sequentially transfer cleaned pumice stones to the different filtering chambers. Specifically, if one chamber has a supply of clean pumice stones and another does not the saturated stones from the second chamber can be discharged into vat 34. As soon as this is accomplished the bottom of the chamber will be sealed and the conveying mechanism will transfer stones already cleaned to that chamber. When this has been accomplished the cycle can be repeated for other chambers which have saturated stones.

It should be noted that the apparatus shown in the drawings can be utilized industrially for removing oil from oil-contaminated water so that the water can be recycled. As an example, quite often cooling water becomes contaminated with oil and unless the oil can be removed therefrom the oil impairs the effective operation of the equipment it comes in contact with. By using the apparatus of the present invention the contaminated water can be cleaned and recycled as required.

While the invention has been described in connection with pumice stones it is to be appreciated that powdered pumice could also be used. When powdered pumice is placed on an oil slick or spill the saturated pumice is removed therefrom by skimming as will be apparent to those skilled in the art.

It thus will be seen that there is provided a method and apparatus which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. A method of removing oil from oil-contaminated water comprising the steps of forming a first filtering chamber having two opposing porous sidewalls and a selectively closeable bottom and a second filtering chamber having two opposing porous sidewalls and a selectively closeable bottom, placing a plurality of pumice stones in the first filtering chamber and the second filtering chamber, to form filter beds in the chambers, pumping oil-contaminated water through the first filtering chamber and then through said second filtering chamber and allowing the oil in the oil-contaminated water to be absorbed by the pumice stones as the water passes through the bed and the porous walls of each of said chambers, as the pumice stones in each of said first and second chambers become saturated with oil, stopping the flow of oil-contaminated water, opening the bottom of the chamber with the oil saturated stones and evacuating the stones therefrom, placing cleaned pumice stones in the evacuated chamber and passing the oil-contaminated water through said chambers, transporting the evacuated oil saturated pumice stones on to a conveyor through a steam cleaning area and steam cleaning the stones to remove the oil therefrom, and conveying the thusly cleaned stones for ready subsequent use in one of said chambers.

References Cited
UNITED STATES PATENTS

| | | | |
|---|---|---|---|
| 2,464,204 | 3/1949 | Baker | 210—DIG. 21 |
| 2,367,384 | 1/1945 | Tymstra et al. | 210—DIG. 21 |
| 3,382,170 | 5/1968 | Pape | 210—DIG. 21 |

SAMIH N. ZAHARNA, Primary Examiner

R. W. BURKS, Assistant Examiner

U.S. Cl. X.R.

210—33, 40, DIG. 21